US005915008A

United States Patent [19]
Dulman

[11] Patent Number: 5,915,008
[45] Date of Patent: Jun. 22, 1999

[54] SYSTEM AND METHOD FOR CHANGING ADVANCED INTELLIGENT NETWORK SERVICES FROM CUSTOMER PREMISES EQUIPMENT

[75] Inventor: Scott Dulman, Arlington, Va.

[73] Assignee: Bell Atlantic Network Services, Inc., Arlington, Va.

[21] Appl. No.: 08/538,935

[22] Filed: Oct. 4, 1995

[51] Int. Cl.⁶ ............................. H04M 3/00; G06F 17/30
[52] U.S. Cl. ......................... 379/201; 379/220; 370/466; 395/187.01; 395/200.3
[58] Field of Search ........................ 395/200.01, 200.02, 395/200.18, 187.01, 200.3, 200.76, 609, 610, 200.6; 370/467, 466; 379/220, 201, 211, 212; 707/9, 10

[56] References Cited

U.S. PATENT DOCUMENTS

| | | | |
|---|---|---|---|
| 4,855,905 | 8/1989 | Estrada et al. | 395/500 |
| 5,241,588 | 8/1993 | Babson, III et al. | 379/201 |
| 5,247,571 | 9/1993 | Kay et al. | 379/207 |
| 5,377,186 | 12/1994 | Wegner et al. | 370/220 |
| 5,436,957 | 7/1995 | McConnell | 379/88 |
| 5,467,388 | 11/1995 | Redd, Jr. et al. | 379/196 |
| 5,570,420 | 10/1996 | Bress et al. | 379/220 |
| 5,572,579 | 11/1996 | Orriss et al. | 379/142 |
| 5,572,583 | 11/1996 | Wheeler, Jr. et al. | 379/207 |
| 5,579,384 | 11/1996 | Seymour | 379/243 |
| 5,583,920 | 12/1996 | Wheeler, Jr. | 379/88.01 |
| 5,623,601 | 4/1997 | Vu | 395/187.01 |
| 5,678,041 | 10/1997 | Baker et al. | 395/188.01 |
| 5,699,513 | 12/1997 | Feigen et al. | 395/187.01 |
| 5,724,355 | 3/1998 | Bruno et al. | 370/401 |
| 5,793,980 | 8/1998 | Glaser et al. | 395/200.61 |

OTHER PUBLICATIONS

Peter A. Russo, Advanced Intelligent Network Service Model, Communications, Apr. 1990. ICC '90, vol. 1, pp. 197–205.

Robert Epley, Advanced Intelligent Network Services Evolution, Communications, Apr. 1990, ICC '90, vol. 1, pp. 206–212.

James J. Garrahan, et al., Intelligent Network Overview, IEEE Communication Magazine, vol. 31, Issue .3, pp. 30–36, Mar. 1993.

Venkata . C, Majeti, et al., Advanced Intelligent Network Directions, IEEE Global Telecommunications Conference, GLOBECOM '93, vol. 3, pp. 1938–1943, Dec. 1993.

*Primary Examiner*—Eddie P. Chan
*Assistant Examiner*—Hong Kim
*Attorney, Agent, or Firm*—McDermott, Will & Emery

[57] ABSTRACT

An arrangement (apparatus and method) for enabling subscribers to use an advanced intelligent network (AIN) services to use existing customer premises equipment to remotely provision their services. Subscribers use existing customer premises equipment, such as personal computers, to locally generate transaction data corresponding to AIN services. The transaction data is stored at the customer premises site in a conventional format, such as ASCII. A call from the customer premises equipment is routed to a security access server, also referred to as a firewall server. After complying with the appropriate security protocols, the service request including the transaction data is routed by the firewall server to an access server via a packet switched network. The access server receives the service request from the customer premises equipment in the conventional format. The access server translates the service request into one or more protocols used by network elements that provide the requested service. The access server routes the translated service requests to various AIN elements as needed to implement the service request, for example integrated service control point (ISCP) and one or more central office switches. The disclosed arrangement is particularly effective for AIN service applications requiring user input of a large amount of transaction data, such as a portable number calling application.

27 Claims, 8 Drawing Sheets

[123] 456-7890 Schedule Override

Begin Date
Time
Location

End Date
Time

OK    Cancel

Figure 5C

[123] 456-7890 Location Numbers

Default Number

Home
Office
Second Office
Cellular
Misc

OK    Cancel

Figure 5B

SYSTEM AND METHOD FOR CHANGING ADVANCED INTELLIGENT NETWORK SERVICES FROM CUSTOMER PREMISES EQUIPMENT

TECHNICAL FIELD

The present invention relates to Advanced Intelligent Networks (AIN) that enable third party service providers and subscribers to modify customer profile data in the AIN databases.

ACRONYMS

The written description uses a large number of acronyms to refer to various services and system components. Although generally known, use of several of these acronyms is not strictly standardized in the art. For purposes of this discussion, acronyms therefore will be defined as follows:

Action Control Point (ACP)
Advanced Intelligent Network (AIN)
AIN Adaptive Protocol Interface (AIN API)
Call Processing Record (CPR)
Common Channel Inter-office Signalling (CCIS)
Customer Premises Equipment (CPE)
DCE Remote Procedure Calls (DCE RPC)
Data and Reporting System (DRS)
Distributed Computing Environment (DCE)
Distributed File System (DFS)
Dual Tone Multifrequency (DTMF)
Generic Data Interface (GDI)
Integrated Service Control Point (ISCP)
Intelligent Peripheral (IP)
Local Area Network (LAN)
Maintenance and Operations Console (MOC)
Memory Administration Center (MAC)
Multi-Services Application Platform (MSAP)
Office Action Control Point (OSO-ACP)
On-line Transaction Processor (OLTP)
Open Software Foundation (OSF)
Operations Support Systems (OSS)
Packet assembler/disassembler (PAD)
Personal Communications Service (PCS)
Personal Identification Number (PIN)
Plain Old Telephone Service (POTS)
Point In Call (PIC)
Point of Presence (POP)
Portable Number Call (PNC)
Private Branch Exchange (PBX)
Service Control Point (SCP)
Service Creation Environment (SCE)
Service Management System (SMS)
Service Switching Point (SSP)
Signaling Point (SP)
Signaling System 7 (SS7)
Signaling Transfer Point (STP)
Transaction Capabilities Applications Protocol (TCAP)
Transaction Processing Application (TP APP)

BACKGROUND ART

In recent years, a number of new service features have been provided by an enhanced telephone network, sometimes referred to as an Advanced Intelligent Network (AIN). In an AIN type system, local and/or toll offices of the public telephone network detect one of a number of call processing events identified as AIN "triggers". For ordinary telephone service calls, there would be no event to trigger AIN processing, and the local and toll office switches would function normally and process such calls without referring to the central database for instructions. An office which detects a trigger will suspend call processing, compile a call data message and forward that message via a common channel interoffice signalling (CCIS) link to an Integrated Service Control Point (ISCP) which includes a Multi-Services Application Platform (MSAP) database.

The ISCP is essentially a central control for the network. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call.

The typical AIN architecture allows the switched transport network to interact with database systems and other so-called intelligent peripherals for obtaining information, data and support operations. This occurs when the switching network is triggered to access the database or peripheral by some condition that arises when a telephone call is being processed. An AIN trigger will typically arise in an AIN-equipped switch, and that will cause the switch to refer to a database for information or service to support processing of the call.

An AIN type network for providing an Area Wide Centrex service was disclosed and described in detail in commonly assigned U.S. Pat. No. 5,247,571 to Kay et al., the disclosure of which is entirely incorporated herein by reference. AIN type processing in such a system is controlled by the ISCP, which typically is operated by the local exchange carrier. The ISCP disclosed in Kay et al. includes a terminal subsystem referred to as a Service Creation Environment or SCE for programming the database in a services control point (SCP) for the services subscribed to by each individual business customer. Each business customer will have a single terminal for establishing a data link to the ISCP via modems. Typically, the terminal would be assigned to a corporate communications officer, and only that officer would have access to the customer's call processing records resident in the data base through the terminal. The corporate communications officer may obtain direct access through the terminal to all of the programming in the database associated with that business customer.

Concomitant with the advances in AIN technology, significant advances have also been made in the customer premise equipment (CPE)—that apparatus which makes up the terminus equipment between which telecommunications calls are extended through the carrier networks. While CPE may be no more than a simple telephone, it also may be quite complex and include such things as private branch exchanges (PBXs), computers interconnected by local area networks (LANs), and other intricate arrangements of terminal equipment and peripheral devices (e.g., facsimile machines, video terminals, databases, and so forth). The composition of CPE used in a typical residential setting, for example, is changing rapidly as computers are increasingly used in the home, and as such things as video, information, and interactive services "on demand" begin to become commercial realities. The components of residential CPE, as is perhaps more typical in a business setting, may also be interconnected in a local area network. The CPE, both residential and commercial, has lately taken on the attributes of a network unto itself.

For example, in known AIN networks, services are generally developed and added through interaction with the ISCP by telephone company personnel at the central office of the public switched telephone network. Typically, a subscriber must call a computer operator at the telephone company who has a direct link to the ISCP and who initiates or changes AIN services on behalf of the requesting subscriber. Such a system fails to take advantage of the additional capabilities provided by modern customer premises equipment.

In addition, as AIN services become more prevalent and sophisticated, it has become desirable to create individual customized services, such as announcements and call routing, for each customer. U.S. Pat. No. 5,241,588 to Babson, III et al. discloses a customized services application for creating and implementing customer service procedures for individual customers of a telephone network. The disclosed telephone network includes SS7 signaling links and a Service Control Point (SCP) database. Babson, III et al. provide for the creation and execution of customized call processing information records stored in the SCP to provide desired services. The records are created by an operator at a display terminal to provide a visual representation of the desired service in the form of a flow chart referred to as a service graph. New customized services are created or existing services are modified in a graphical environment by creating or modifying a customer's service graph on the display terminal. The displayed service is translated into a binary representation, and the data corresponding to the service graph is then stored in the SCP. During a subsequent call, either to the subscriber's number or from the subscriber's line, the SCP will receive a request from a switch of the network for information as to how to process the call. In response to the request, the SCP retrieves the customized subscriber's service procedures corresponding to the request and instructs the switch to execute the retrieved service procedures to provide the appropriate service for the customer.

Efforts have also been made to enable individual subscribers to make changes in the customer profile data stored in the ISCP database. For example, commonly-assigned allowed application Ser. No. 08/384,636, filed Feb. 6, 1995, entitled "Method and Apparatus for Selectively Blocking Incoming Calls," now U.S Pat. No. 5,467,388, issued Nov. 14, 1995, the disclosure of which is incorporated herein in its entirety by reference, discloses a method of supplying a list of numbers and authorization tiers to be stored in an ISCP database for a selective call blocking system. Specifically, the ISCP responds to a TCAP query message, generated at a central office switch in response to a subscriber call, by providing call processing data to the central office switch in order to establish an interface session with the subscriber. The interface session may be established, for example, by terminating the subscriber call to an intelligent peripheral (IP) that accepts DTMF inputs. During the interface session, the subscriber inputs the telephone numbers and authorization tiers using the DTMF keypad. After the interface session, the data input by the subscriber identifying telephone numbers authorized to bypass the subscriber's call blocking service is loaded into the ISCP database.

Despite the foregoing, the above-described systems only offer a limited number of telephone services and do not disclose interaction between the public switched network and customer premises equipment to create and modify AIN services. Rather, users must manually input information via a DTMF keypad in order to provide the necessary parameters for AIN services. Such manual entry is both time-consuming from the user standpoint and from the point of using up AIN resources for mere data entry. Moreover, manual entry will often result in erroneous inputs. As AIN services become more sophisticated, such manual entry techniques will become unacceptable to the user.

Although the above-described Kay et al. and Babson, III et al. patents disclose terminal systems that enable data entry by a key terminal, as opposed to manual DTMF input, the types of customer services terminal applications disclosed in Kay et al. and Babson, III et al. tend to be dedicated, network specific systems that must be coupled to a specific SCP. Thus, the disclosed systems lack the flexibility needed to be used by a subscriber at any desired location.

DISCLOSURE OF THE INVENTION

There is a need for an AIN provisioning system that enables use of existing customer premises equipment to download data for activation and modification of AIN services for users of the customer premises equipment.

There is also a need for a secure AIN customer provision access system that limits customer access to transaction data for corresponding subscriber services.

There is also a need for a customer transaction data processing system that automatically converts transaction data representing user-specific data for intelligent network services and supplied as part of a customer service request into AIN-compatible provisioning data. It is also desirable that such a system provides the AIN-compatible provisioning data with the necessary AIN interface protocols corresponding to the programmable AIN nodes that receive the AIN-compatible provisioning data.

There is also a need for an AIN routing server system that provides automatic routing of provisioning data to AIN elements, as needed, to activate or modify AIN services in response to a service change request downloaded from the customer premises equipment. The AIN routing server system should have the capability of routing the provisioning data to multiple AIN elements at different geographic areas as needed, including intercarrier routing.

These and other needs are met by the present invention, which provides an arrangement (apparatus and method) enabling subscribers to use customer premises equipment (CPE) to download a service request comprising transaction data in order to activate or modify AIN services. The AIN customer provisioning system of the present invention comprises a security interface, also referred to as a firewall server, that controls customer access to the AIN provisioning system, and an access server that receives the CPE service request from the security interface via a packet switched network. The access server stores a plurality of interface protocols for each of the programmable nodes of the AIN, and automatically converts the CPE service request comprising the transaction data to AIN-compatible provisioning data having the appropriate interface protocol. The access server then routes the provisioning data to the appropriate programmable AIN nodes in order to activate or modify the requested AIN service. The provisioning data is routed to the AIN nodes using, for example, the packet switched network, Frame Relay, SMDS, ISDN, etc.

Thus, a subscriber is able to use existing customer premises equipment to generate transaction data identifying customized AIN services such as call forwarding, call blocking, portable number routing, etc. for a plurality of CPE users, for example, employees at a sales office or at a corporate headquarters. The transaction data may be generated in the CPE using existing software, such as spreadsheet programs, scheduling programs, collaborative authority software, groupware, E-mail, ACD software, etc. The CPE accesses the AIN via a service switching point using a communication link such as, for example, a telephone line. After supplying the appropriate passwords in accordance with an AIN interface security protocol, the CPE link is connected to the access server in the AIN provisioning system, at which point the CPE supplies the access server with the transaction data in order to activate or change the requested AIN services.

The present invention also provides a method for changing customized communications services in an intelligent communication network for users of customer premises equipment having a communication link with a first programmable node of the communication network. The method according to the present invention provides protocol translation information for a plurality of interface protocols to a second programmable node adapted to receive data in a format corresponding to the customer premises equipment. Security access information is provided to a third programmable node enabling limited access by the customer premises equipment to the second programmable node. A service request received by the first programmable node is transported to the third programmable node via a communication link, and the service request is passed from the third programmable node to the second programmable node in accordance with the supplied security access information. The service request containing the CPE-format data is translated in the second programmable node to at least one of the interface protocols for at least one programmable node selected to implement the service request, and the translated service request is routed to the at least one programmable node selected to implement the service request.

Thus, the present invention enables users of customer premises equipment to manage their AIN services at their customer premises site, thereby relieving the resources of the AIN. Moreover, CPE users are able to create, modify, and delete sophisticated user profiles without tying up network resources. After the user profiles are completed at the CPE, the information can be easily downloaded to the AIN for execution.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIGS. 5A, 5B, and 5C are diagrams illustrating a graphic user interface for a customer premises equipment generating transaction data for a portable number calling service, to be activated using the AIN customer provisioning system of the present invention.

BEST MODE FOR CARRYING OUT THE INVENTION

The present invention provides a provisioning system enabling subscribers to activate services in an advanced intelligent network (AIN) using conventional customer premises equipment. An overview of the advanced intelligent network will first be provided, followed by a detailed description of the preferred embodiment of the AIN customer provisioning system of the present invention.

Figure 1:
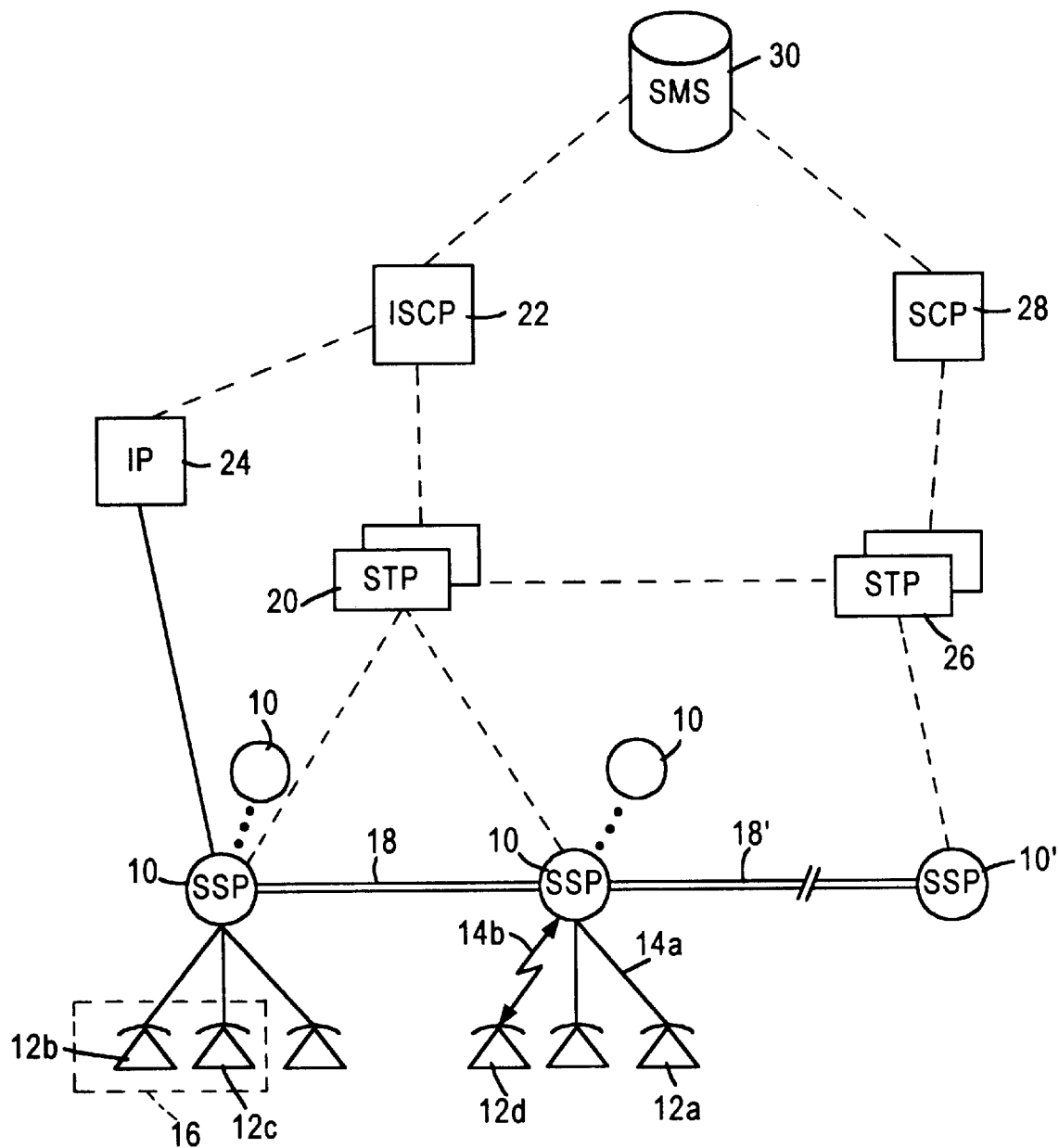
FIG. 1 is a simplified block diagram of an Advanced Intelligent Network.

FIG. 1 provides a simplified block diagram of a public telephone type network having AIN capabilities. The AIN network shown in FIG. 1 resembles the type shown in U.S. Pat. No. 5,247,571 to Kay et al., the disclosure of which is incorporated in its entirety by reference. The network of FIG. 1 includes a switched traffic network and a common channel signaling network used to control the signaling for the switched traffic network. Although the service provisioning of the present invention will apply to other types of networks, in the illustrated example, the various networks all provide telephone type services.

The network of FIG. 1 includes a number of end office switching systems 10, also referred to as service switching points (SSP), providing connections to and from local communication lines coupled to end users equipment. Although the end users equipment may consist of telephone station sets 12a connected to POTS or ISDN lines 14a, the end users equipment may be arranged as customer premises equipment 16 serving users 12b and 12c. The CPE 16 may be arranged to provide Centrex services as disclosed in the above-identified Kay et al. patent, and will typically include a personal computer (not shown) acting as a CPE server to manage the CPE 16. In addition, an end user 12d may have a wireless link 14b to the SSP 10 via, for example, a cellular transmission system.

The end offices 10 are typically arranged into a local exchange carrier network typically including one or more tandem switching offices (not shown) providing trunk connections between end offices. As such, the local exchange carrier network comprises a series of switching offices 10 interconnected by voice grade trunks 18. One or more trunks 18' will typically connect one or more switching offices to at least one switch 10' in other carrier networks.

Each switching office 10 has at least minimal SS7 signaling capability, which is conventionally referred to as a signaling point (SP) in reference to the SS7 network. In the local exchange network, at least one of the switching offices 10, and preferably all, are programmed to recognize identified events or points in call (PICs). In response to a PIC, the switching office 10 triggers a Transaction Capabilities Applications Protocol (TCAP) query message through the signaling network to an Integrated Service Control Point (ISCP) 22 for instructions relating to AIN type services.

The ISCP 22 offers AIN routing control functionalities to customers of the local exchange carrier. For example, the ISCP includes a database (not shown) containing call processing records (CPRs) for controlling that carrier's AIN routing services. The ISCP 22 may also access a separate database, for example, to supplement its routing tables for certain services. In the preferred system, a second function of the ISCP is to serve as a mediation point. Specifically, the ISCP mediates queries and responses between the local exchange carrier network components and databases operated by other carriers.

The ISCP 22 is an integrated system, and includes a Service Management System (SMS), a Data and Reporting System (DRS) and the actual database referred to as a Service Control Point (SCP). The ISCP also typically includes a terminal subsystem referred to as a Service Creation Environment or SCE for programming the database in the SCP for the services subscribed to by each individual business customer. The components of the ISCP are connected by an internal, high-speed data network, such as a token ring network.

The switches 10 typically comprise programmable digital switches with CCIS communications capabilities. One example of such a switch is a 5ESS type switch manufactured by AT&T, although other vendors, such as NORTHERN TELECOM and SIEMENS, manufacture comparable digital switches which could serve as the SSPs and SPs. The SSP type implementation of such switches differs from the SP type implementation of such switches in that the SSP switch includes additional software to recognize the full set of AIN triggers and launch appropriate queries.

Within the local exchange network, the common channel interoffice signaling (CCIS) network includes one or more Signaling Transfer Points (STPs) 20 and data links shown as dotted lines between the STP(s) 20 and the switching offices 10. Typically, STPs 20 are implemented as matching or mated pairs, to provide a high level of redundancy. A data link also connects each of the STPs of pair 20 to the ISCP 22. One or more data links also connect the STPs 20 in the local exchange carrier network to mated pairs of STPs 26 in networks of a second carrier.

The local exchange carrier network may also include one or more intelligent peripherals (IPs) 24. The IP 24 provides enhanced announcement and digit collection capabilities and/or speech recognition. The IP 24 connects to the switch 10 of the local exchange carrier network via an appropriate line circuit. The IP 24 communicates with the ISCP 22 through a data communication network separate from the telephone company switching offices and associated interoffice signalling network. For example, the data communication network enabling communications between the IP and the ISCP may be a packet switched network using TCP/IP protocol.

Commonly assigned copending application Ser. No. 08/248,980, filed May 24, 1994, entitled "Advanced Intelligent Network with Intelligent Peripherals Interfaced to the Integrated Services Control Point," now U.S. Pat. No. 5,572,583, issued Nov. 5, 1997 provides a more detailed disclosure of an AIN type network, including the structure of an SSP switch, the structure of an ISCP and the structure of an IP, and the disclosure of that application is incorporated herein in its entirety by reference.

As shown in FIG. 1, the STP's 20 in the local exchange carrier network are connected by data links, such as SS#7, to the STP's 26 of a second carrier, which may be another local exchange carrier, or an inter-exchange carrier. As shown in FIG. 1, the second carrier network comprises a Services Control Point (SCP) 28 and a Service Management System (SMS) 30 that stores limited data, such as for "800" service. The routing tables utilized in the SCP type databases typically are more limited than those in the ISCP 17. Although the range of trigger events is limited, the switching systems 10' in the second carrier network can query the corresponding SCP 28 via the STP 26 for routing information.

An end office switching system 10 shown in FIG. 1 normally responds to a service request on a local communication line connected thereto, for example an off-hook from station 12 followed by dialed digit information, to selectively connect the requesting line to another selected local communication line, for example to the line to station 12a. The connection can be made locally through only the connected end office switching system but typically will go through a number of switching systems.

In the normal call processing, the central office switching system responds to an off-hook and receives dialed digits from the calling station. The central office switching system analyzes the received digits to determine if the call is local or not. If the called station is local and the call can be completed through the one central office (intraoffice call), the central office switching system connects the calling station to the called station. If, however, the called station is not local, the call must be completed through one or more distant central offices (interoffice call), and further processing is necessary. If at this point the call were connected serially through the trunks and appropriate central offices between the caller and the called party using in-band signalling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the originating end office switching system suspends the call and sends a message through the CCIS network to the end office switching system serving the destination telephone line. The terminating end office determines whether or not the called station is busy. If the called station is busy, the terminating end office so informs the originating end office via CCIS message, and the originating end office provides a busy signal to the calling station. If the called station is not busy, the terminating end office so informs the originating end central office. The originating office provides ringback to the caller, and the terminating office applies ringing current to the line to the called party. When the telephone station connected to the called line goes off-hook, the terminating switching office informs the originating switching office, and the two offices establish a telephone connection via the trunks and end offices (and/or tandem offices) of the network between the calling and called stations.

For an AIN type service, such as call redirection based on data stored in the ISCP 22, the end offices and/or tandems are SSP capable and detect one of a number of call processing events, each identified as a 'point in call' (PIC), to trigger AIN type processing. Specifically, in response to such a PIC, a switching system such as switch 10 suspends call processing, compiles a call data message, also referred to as a TCAP query message, and forwards that message via common channel interoffice signalling (CCIS) links and one or more STPs 20 to an ISCP 22. If needed, the ISCP 22 can instruct the particular switching office to obtain and forward additional information. Once sufficient information has reached the ISCP 22, the ISCP 22 accesses its stored data tables and or data in external databases to translate the received data into a call control message and returns the call control message to the switching office via the STP 20 and the appropriate CCIS links. The switching office 10 uses the call control message to complete the particular call through the public switched network in the manner specified by the subscriber's data file in the ISCP 22.

The SCP 28 offers similar capabilities in the network of the other carrier, but the range of service features offered by that database is more limited. For example, the SCP 28 may offer 800 number calling services with a limited number of related call routing options. If a caller at station 12 dials an 800 number corresponding to the other carrier, the switch 10 routes the call to a switch in the other carrier, which recognizes the 800 number in the CCIS information provided with the call and launches a CCIS query to the SCP 28. The SCP 28 translates the dialed 800 number into an actual destination number, and transmits a CCIS response message back to the switch generating the CCIS query, which then routes the call through the public network to the station identified by the number sent back by the SCP 28, using CCIS call routing procedures of the type discussed above.

In a mediated call processing operation, a switch such as SSP switch 10 reaches a point in call (PIC) in processing a particular call which triggers AIN type processing. A variety of triggers are known including the full range of AIN triggers, virtual numbers (e.g. 500, 800, 900) etc. In response to the PIC trigger, the switch 10 launches a TCAP query through the STP 20 to the ISCP 22. The ISCP 22 accesses the relevant call processing record (CPR) for the subscriber. In a mediated service the CPR will identify a plurality of carriers and/or the carriers' databases, for calls satisfying different predetermined criteria.

The ISCP 22 proceeds to obtain call control or routing information that the switch 10 needs to process the call. If conditions relating to the present call conform to criteria for processing of the call by the local exchange carrier, then the ISCP 22 retrieves a CPR from its own internal SCP database to determine how to process the call and provides an appropriate response message back to the switch 10. If the call meets other criteria, then the ISCP 22 communicates with a selected one of a plurality of other SCP, such as SCP 28 through the SS7 network (i.e., via STP 26). The ISCP 22 may access a separate database to obtain information needed to direct messages through the SS7 network to the appropriate SCP.

The one SCP 28 will contain a call processing record (CPR) for providing the subscriber a customized service on the particular type of call. The subscriber has previously communicated to the carrier how certain calls should be processed, and the carrier's personnel will have established the appropriate CPR in the SCP 28.

The SCP 28 accesses the CPR to determine how to process the particular call and returns an appropriate instruction, in a TCAP response message, to the ISCP 22. The ISCP 22 in turn performs a mediation function. Specifically, the ISCP 22 processes the instructions from the alternate carrier's SCP to insure validity and compatibility with the processes of the elements of the local exchanged network that will handle the call. Based on validated instructions, the ISCP formulates an appropriate TCAP response message. The ISCP 22 transmits that message through SS7 links and one or more STPs 20 to the switch 10.

Figure 2:
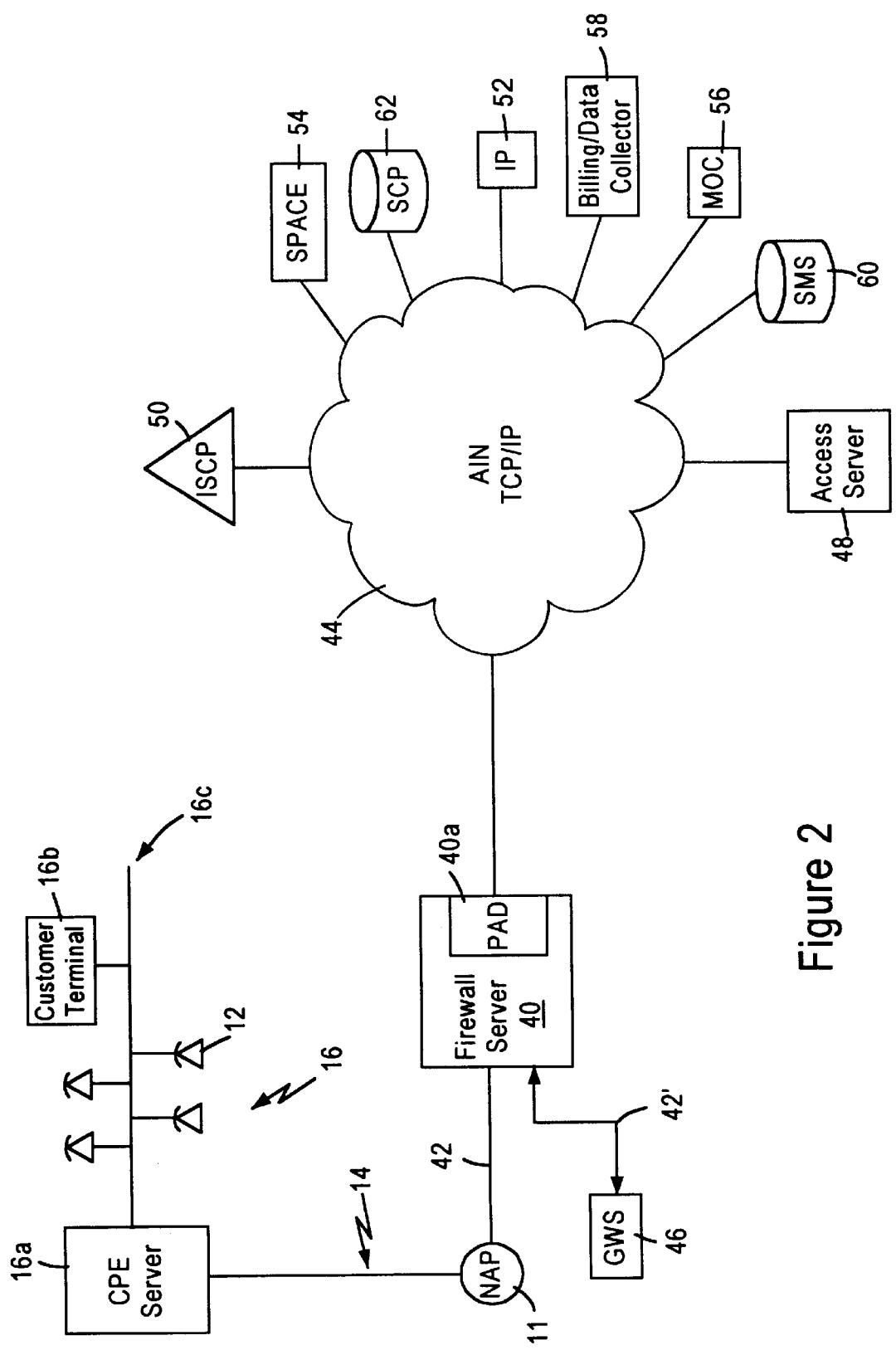
FIG. 2 is a block diagram of the AIN customer provisioning system, according to a preferred embodiment of the present invention, for provisioning the network of FIG. 1.

FIG. 2 is a block diagram of the AIN customer provisioning system according to a preferred embodiment of the present invention. According to the present invention, the AIN customer provisioning system is adapted to enable existing customer premises equipment to download data in order to activate AIN services. Thus, the AIN provisioning system of FIG. 2 provides to the AIN elements of FIG. 1 the provisioning data necessary to activate the desired AIN services. The term "AIN element" refers to a programmable node of the AIN network that receives and stores data in order to activate, modify or delete an AIN service for a subscriber. Hence, the SSP 10 may store translation tables that are updated in view of changes to the subscriber's profile. Similarly, CPR data may be updated in the databases in the ISCP 22 and/or the SCP 28 in order to change services such as call forwarding, call blocking, call roaming, etc. Finally, customer profile information may be updated in the SMS 30 if the subscriber has subscribed to a 500, 800 or 900-type telephone service. In addition, operation scripts and other programming information may be provided to the IP 52 to modify functions such as voice response unit access parameters.

As shown in FIG. 2, the AIN provisioning system is coupled to a network access point (NAP) 11, also referred to as a central office, that provides a communication link 14 to the CPE 16. The NAP 11 may be a conventional switch, for example 1A, DMS or 5E, or an ATM switch. As shown in FIG. 2, the CPE 16 comprises a CPE server 16a, a customer terminal 16b, for example, personal computer, and a local area network 16c that connects the customer terminal 16b and other users' telephones 12 to the CPE server 16a. As known in the art, the CPE server 16a is typically a personal computer or mini computer that manages the operation of the customer terminal device 16b and the users' telephones 12 on the local area network 16c. The CPE server 16a may have alternative configurations, such as a modem connection to a local data network separate from the public switched telephone network, access through an Internet Access provider and gateway server 46 (discussed in detail below), or a Hypertext-based system using Hypertext Markup Language (HTML) as the GUI-based access and Hypertext Transport Protocol (HTTP) on top of TCP/IP as the method of transport through Internet. The customer premises equipment 16 may be arranged as a centrex-type system, as discussed above with respect to U.S. Pat. No. 5,247,571 to Kay et al., or may be a PBX-based system. In any event, the CPE server 16a manages the customer terminals 16b and telephones 12 using a PC-based system for management functions including call processing, configuration data entry, time logging, and subscription services, as described in detail below. The CPE server 16a may be implemented, for example, by the computer systems such as: COMPAQ Model 4000 Rack Mounted Server; MICROSOFT WINDOWS NT; WINDOWS NT Remote Access Server; or U.S. ROBOTICS HST Dual Standard Rack Mounted Modem Pool.

Referring to FIG. 2, the AIN provisioning system comprises a firewall server 40 that is connected to the NAP 11 by a communication link 42. According to the preferred embodiment, the communication link 42 between the NAP 11 and the firewall server 40 is a line sided connection carrying data in TCP/IP format to transmit service requests from the customer premises equipment 16 to the firewall server 40. As an alternative to the conventional POTS/ISDN link 14 supporting a dial-up modem at the customer premises 16, the link 14 may be modified to handle a much higher bandwidth using newer transport techniques, such as frame relay, Super Multimegabit Data Services (SMDS), or ATM. The firewall server 40 comprises a packet assembler/disassembler (PAD) 40a that assembles and disassembles data travelling to and from a packet switched network 44, respectively. The packet switched network 44 is a data network using TCP/IP protocol, and may be implemented using X.25, frame relay, SMDS, or ATM technologies.

Exemplary products that may be used to implement the firewall server 40 include the IBM Net SP Secured Network Gateway, or NETWORK SYSTEMS Corporation Security Router.

The firewall server 40 provides security access to the packet switched network 44 in accordance with a predetermined security access procedure. For example, the security access information corresponding to the customer premises equipment 16 will typically be supplied to the firewall server 40 during the initial provisioning of the customer premises equipment to the advanced intelligent network. According to the preferred embodiment, the firewall server 40, also referred to as a proxy server, analyzes the MAC address of the CPE server 16. In other words, the intelligent network preferably includes a memory administration center (MAC) (not shown) that stores the hardware configuration and assignment of office equipment in the to NAP 11 for the subscriber at the CPE 16. The firewall server compares the MAC address of the CPE 16 with the IP address of the service request forwarded by the NAP 11 from the CPE server 16a. The firewall server 40 compares the IP address with the MAC address, and provides limited access to the packet switch network 44 in accordance with the stored security access information.

In addition, the firewall server 40 notes the digital signature of the service request that identifies the time that the service request was sent and the originating location from which the service request was sent. If the digital signatures are consistent with the security information stored in the firewall server, the firewall server allows the service request message from the CPE server 16a to be sent to the access server 48 via the packet switch network 44. Other available security features include data encryption using the Data Encryption Standard (DES), and two part authentication such as the Kerbirus system developed at MIT.

Alternately, since the firewall server 40 receives the service request generated by the CPE 16 in a TCP/IP format, the firewall server may receive the server requests via Internet. In such a case, the firewall server 40 may receive the service request message via a communication link 42' coupled to a gateway server (GWS) 46 that sends and receives messages to and from the Internet or the Worldwide Web. If the firewall server 40 receives the server's request from the gateway server 46 via the communication link 42', the firewall server 40 may request an additional password or security protocol since the firewall server 40 is unable to verify the location of the customer premises equipment 16 using the MAC address, as would be otherwise available on link 42.

After the firewall server 40 verifies the authorized access of the server's request, the firewall server 40 passes the service request to an access server 48 via the packet switched network 44 by packetizing the service request in the PAD 40a. As shown in FIG. 2, the packet switched network 44 is adapted to transport packets having AIN format, as well as TCP/IP format. However, each AIN element that sends and receives data through the packet switched network 44 may have different interface protocols. For example, the ISCP 50 accepts TA-1129+ interface protocol developed by BELLCORE to receive query messages from the IP 52. The IP also accepts 1129+ protocol messages. In addition, an alternative or complementary protocol used by the ISCP 50 is the generic data interface (GDI), which is simpler, more generic, and carries more data than the 1129+ interface. In addition, the ISCP 50 is able to initiate communications using the GDI interface. Additional details regarding the GDI interface are found in the BELLCORE document "Generic getData/sendData Interface (GDI)", TM-CC1.0-CCGN-R001, the disclosure of which is incorporated in its entirety herein by reference.

Similarly, the ISCP 50 accepts service creation and provisioning messages from a service creation and provisioning system 54 that uses the BELLCORE SPACE Provisioning Protocol. Specifically, the SPACE Provisioning system 54 creates a call processing record (CPR) that is loaded into the SMS in the ISCP 50 via the packet switched network 44. The SPACE provisioning system 54 is coupled to the packet switched network 44 and is dedicated to programming the databases in a specific ISCP, whereby each ISCP will have a "mated" SPACE provisioning system 54. A more detailed description of an exemplary implementation of the SPACE provisioning system 54 is found in U.S. Pat. No. 5,241,588 to Babson, III et al., the disclosure of which is incorporated in its entirety by reference.

As discussed above, the programmable nodes of the advanced intelligent communication network use specific interface protocols to send and receive related call processing data. When used to download provisioning data, the CPE server 16a outputs a service request comprising transaction data, also referred to as user data, that represents subscriber profile information to be supplied to the database in the ISCP 50. The transaction data prepared by the CPE server is typically generated, for example, by a spreadsheet or word processing application in a conventional format, such as a MICROSOFT WINDOWS or DOS file storing ASCII data. Other existing software may be used to generate the transaction data, including scheduling programs such as Meeting Maker and Schedule Plus, or groupware, E-mail, collaborative authoring, automatic call distribution, etc.

However, the ISCP 50 accepts only specific data according to ISCP-compatible interface protocols. For example, the ISCP 50 is adapted to read GDI, 1129+ or SPACE-formatted provisioning data, as opposed to ASCII data. Thus, if the ASCII data was supplied directly from the CPE server 16a via the firewall server 40 and the packet switched network 44 to the ISCP 50, the ISCP 50 would consider the service request carrying the ASCII data as unintelligible.

The AIN customer provisioning system of FIG. 2 comprises an access server 48 that enables the programmable nodes of the AIN network, also referred to as AIN elements, to be able to process the service change request downloaded from the customer premises equipment 16. The access server 48 is provided with a plurality of interface protocols for each of the programmable nodes of the AIN. The access server 48 automatically converts the CPE service request carrying the transaction data in ASCII format, for example in a DOS spreadsheet file, to AIN-compatible provisioning data having the appropriate interface protocol, such as the BELLCORE TA-1129+ interface used in the ISCP 50. The access server 48 preferably includes all interface protocols for the programmable AIN elements, including: TA-1129+ Interface; Generic Data Interface (GDI); SPACE Provisioning Interface; ISCP Billing Collector Interface; GR-1129-CORE Interface; and Transaction Capabilities Application Protocol (TCAP). In addition, the access server 48 is able to process all conventional personal computer data formats. Examples of personal computer communications interfaces include TCP/IP, ISDN/BRI, SLIP and X.400.

The access server 48 may be implemented using UNIX Servers such as IBM RS/6000, HEWLETT PACKARD HP 9000, or the SUN MICROSYSTEMS SPARC Station. Similarly, the operating systems for the access server 48 may be the IBM AIX, HEWLETT PACKARD HP-UX, or the SUN SOLARIS SYSTEMS. The access server 48 provides the access server logic for on-line transaction processing services. As discussed in detail below, the access server is preferably constructed using the Open Software Foundation's distributed computing environment (DCE) systems software. As implemented, the Open Software Foundation DCE transaction processing platform in the access server 48 is enhanced to accommodate the 1129+, GDI, and SPACE provisioning messages, to send the results of a query, create, update or delete transaction to the ISCP 50 over any standard DCE accessible application.

In addition, the access server 48 performs resource management processes such as initiating application programs, delivering service transactions to the ISCP 50, and interfacing with other AIN network elements, including the IP 52, a maintenance and operations console (MOC) 56, Billing/Data Collector 58, a Global SMS 60, and an auxiliary SCP 62 through secured data network communications in the packet switched network 44.

Thus, the access server 48 is able to translate the CPE-supplied service request and convert the service request to network element-compatible data with the appropriate interface protocol. The maintenance and operations console (MOC) 56 is a work station that provides AIN operators with the software tools required to monitor, administer and operate each AIN network element. The maintenance and operations console (MOC) 56 provides all capacity planning, performance, operations support, monitoring, testing, trouble reporting, configuration, administration, and installation tools for a network operation. Although not shown in FIG. 2, the access server 48 may also provide selected portions of the converted service requests to various operations support systems (OSS).

Figure 3:
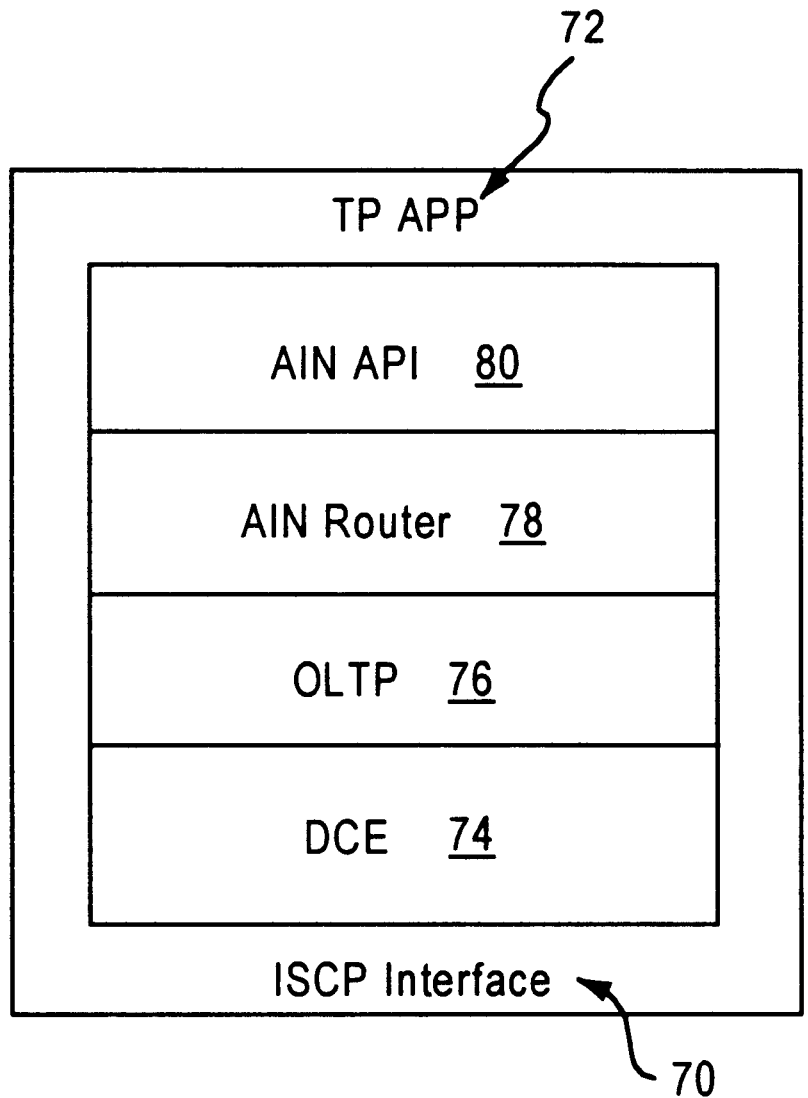
FIG. 3 is a simplified block diagram of the AIN access server of FIG. 2.

FIG. 3 is a simplified block diagram showing the systems architecture of the access server 48 according to a preferred embodiment of the present invention. As suggested above, the access server 48 is composed of a plurality of software-based modules 74, 76, 78 and 80 for handling the necessary resource management processes, protocol translations, and message routing to the respective programmable nodes of the advanced intelligent network. Although not shown in FIG. 3, the access server 48 may also include an optional HTML layer to provide the graphic user interface during online sessions. The high level functionality of the access server 48 is based upon providing ISCP interface services using the ISCP interface application 70. In addition, the access server 48 provides a transaction processing application (TP APP) 72 for processing service change transactions involving different AIN elements based upon the service application requested by the customer, for example, call forwarding, selective call blocking, portable number service, etc. Both the ISCP interface application 70 and the transaction processing application (TP APP) 72 rely on the software-based modules to provide the support for high level functionality of the respective application.

The access server 48 includes a distributed computing environment (DCE) module 74 that conforms to the standards specified by the Open Software Foundation (OSF). The DCE 74 provides basic processing services, such as POSIX Threads, DCE Remote Procedure Calls (DCE RPC), security services (for example, Kerberos), a distributed file system (DFS), timing services, and naming services. As known to those skilled in the art, the DCE 74 is typically implemented as a layer on top of the UNIX software, and as such provides technology services.

The access server 48 also includes an on-line transaction processor (OLTP) 76 that handles the high volume of on-line transactions from the CPE equipment of the different subscribers on the network. The on-line transaction processor handles all transactions between the access server 48 and the CPE server 16*a*, as well as transactions between the access server 48 and the programmable nodes of the AIN network sending and receiving messages to and from the access server 48, respectively. The OLTP 76 of the access server 48 receives the service request via the packet switched network 44 and performs error handling to check for formatting and syntax error in the data. As discussed below with respect to FIGS. 4A, 4B, and 4C, the service request from the CPE server 16*a* may be in the form of a batch download, or may be in the form of an interactive session with the access server 48. In the case of the latter interactive session, the OLTP 76 in the access server 48 may include a time-out or caller abandon function while waiting for caller input or an incorrect response from the caller. In order to ensure redundancy, the DCE 74 and OLTP 76 level services are replicated across the AIN. Transactions are preferably segmented and queued to improve system performance and ensure that customer data is never lost.

The access server 48 also includes an AIN router module 78. The AIN router module 78 determines the destinations of the translated service change requests. For example, a service request from a CPE server 16*a* may result in the generation of multiple AIN messages that need to be sent to different programmable nodes of the AIN network. In addition, additional AIN messages may be needed to be sent to different databases of alternate carriers, for example, when a new 800 service or 900 service is established. For a Centrex-based system, a service change request may also require a plurality of different switches 10 to be updated at different geographic locations.

Thus, the AIN router module 78 assigns the routing information identifying the necessary destination for the translated service request message based on the logical location of the services created. The routing parameters are based in part upon the nature of the transaction defined by the service request. For example, upon receiving a transaction request, the on-line transaction processor 76 processes the transaction and characterizes the transaction based on a plurality of transaction control factors including: transaction type, transaction size, current transaction load or congestion, transaction service (e.g., video, data or voice), transaction response time requirements and transaction destination. The transaction type refers to the type of transaction to be performed, for example, a batch update through SPACE, local storage for external GDI database, or DTMF simulation through 1129+ for dynamic transactions. Transaction size may determine the AIN element to process the transaction, for example, transactions over 1024 bytes will automatically be routed through the SPACE provisioning protocol to the system 54, whereas transactions under a length of 256 bytes will be routed through 1129+. Similarly, the current transaction load or congestion indicates the queue size, which will determined whether to route the translated message through the SPACE terminal 54, to queue and transmit the message later from the access server, or whether to reject the received message. With respect to transaction service, the service type may be prioritized for example, giving voice the top priority and data the lowest priority. Transaction response time indicates that the data is prioritized based on immediacy requirements. For example, 1129+ and GDI provide immediate updates, whereas the SPACE provisioning interface may be used for batch and delayed transactions.

After the service request has been processed by the OLTP 76, the AIN router platform 78 determines the proper routing of the selected portions of the translated service requests on the basis of the following routing parameters: application system routing, current communications load or congestion, applications specific routing, response time requirements, and security requirements. With respect to application system routing, the AIN router 78 will initiate multiple 1129+ transactions when multiple ISCPs need to be simultaneously updated. Similarly, for current communications load, if the current IP or ISCP is unavailable, then the message may be queued or rerouted to an alternative IP or ISCP, or rejected. For applications specific routing, if the service request contains invalid data, then the access server may route a message to the SSP 10 to advise the customer of the error, and that a service request was rejected. With respect to response time requirements, if the transaction cannot be accomplished in time, then either a different interface is selected, an equivalent application service from a different node is selected, or the service request is rejected. Finally, there may be customer specific routing parameters, whereby large businesses, inter-exchange carriers, and federal agencies as customers may use a specialized and/or dedicated IP. In such cases, the customer may also have a preference for a specific IP, ISCP or other AIN node. In such cases, the AIN router 78 should incorporate a priority data structure of nodes for these customers. Similarly, data traffic may be rerouted to least used and least cost routes.

Thus, the AIN router 78 may route a message to different programmable AIN elements for different reasons, such as if a first element is congested with a backlog of AIN processing requests. For example, although only one ISCP 50 is shown in FIG. 2, an advanced intelligent network may have two or more ISCPs 50, or use complementary SCPs 62 to handle limited functions normally assigned to the ISCP. In such a case, the AIN router 78 may route certain service requests translated to TCAP query messages to the SCP 62 instead of the ISCP 50. Similarly, if a service request does not have a critical response time requirement, the translated service request may be routed to a buffer storage device for later processing.

The access server 48 also includes an AIN adaptive protocol interface (AIN/API) 80 that handles the actual protocol conversion. The AIN API 80 is provided with the protocol translation information for each of the programmable nodes of the advanced intelligent network in order to enable protocol translation from the format of the transaction data generated by the CPE server 16*a* to the appropriate protocol format, including data format and interface protocol, for the respective AIN element. For example, the AIN API 80 is able to translate transaction data contained in the service request from the CPE 16 to one of three ISCP transaction processing interfaces, namely 1129+, SPACE provisioning, or GDI. The AIN API 80 may also be adapted to translate the transaction data to other future protocols for any of the SCP's.

The AIN API 80 translates the transaction data received in the CPE service request on the basis of the destination assigned by the AIN router 78. For example, if the destination was the OSS or the database management system in the ISCP 50, then the GDI interface would be used; if the destination is the SMS 60, then the SPACE provisioning system is used; if the destination is the IP 52 or the ISCP 50, then the 1129+ interface protocol is used; if the billing/data collector 58 is the destination, then a billing/data collector interface is used; and if the destination is an SSP 10, then the 1129 interface protocol is used.

Thus, the access server 48 may manage a plurality of different interfaces for AIN network elements, including communications between intelligent peripherals (IP), data to the ISCP 50, data to the Global SMS, the STP, and the SSP. Moreover, the access server 48 may be applied to video dial tone networks, at which point the access server would route messages to the level 1 video gateway, and the level 2 video gateway. An example of remote provisioning of video dial tone networks is found in commonly-assigned, U.S. application Ser. No. 08/441,590, filed May 16, 1995, entitled "Operation Support System For Service Creation and Network Provisioning for Video Dial Tone Networks,"now U.S. Pat. No. 5,650,994, issued Jul. 22, 1997, the disclosure of which is incorporated herein in its entirety by reference.

According to the present invention, a service creation system, such as the SPACE system 54 or an Operational Support System, provisions the NAP 11, the firewall server 40, also referred to as the proxy server, and preferably the ISCP, to route a call to a predetermined virtual number to be terminated to the firewall server. The access server 48 is provided with the protocol translation information to convert the CPE format transaction data to the interface protocols of the programmable nodes of the AIN network. The firewall server is also provisioned with the security access information to enable limited access by the customer premises equipment to the access server 48. After the link between the CPE and the access server is connected, the access server initiates a session with the CPE to receive the service request. After receiving the service request, the access server returns an acknowledgement to the CPE and processes the request by performing the routing and translation functions. If necessary, the access server suspends the call with the CPE and generates a TCAP query message to the ISCP in order to obtain additional call processing data. After the access server has processed the service request by translating the service request and the transaction data stored therein, the access server outputs the translated service request to the appropriate AIN elements in the corresponding protocol(s).

Thus, a subscriber is able to use existing customer premises equipment (CPE) to generate transaction data identifying customized AIN services such as call forwarding, call blocking, portable number routing, etc. for a plurality of CPE users, for example, employees at a sales office or at a corporate headquarters. The transaction data may be generated in the CPE using existing software, such as a spreadsheet program. The CPE accesses the AIN via a Network Access Point (NAP), for example an ATM switch, using a communication link, for example, a telephone line. After supplying the appropriate passwords in accordance with an AIN interface security protocol, the CPE link is connected to the access server in the AIN provisioning network, at which point the CPE supplies the access server with the transaction data in order to activate or change the requested AIN services.

Figure 4A:
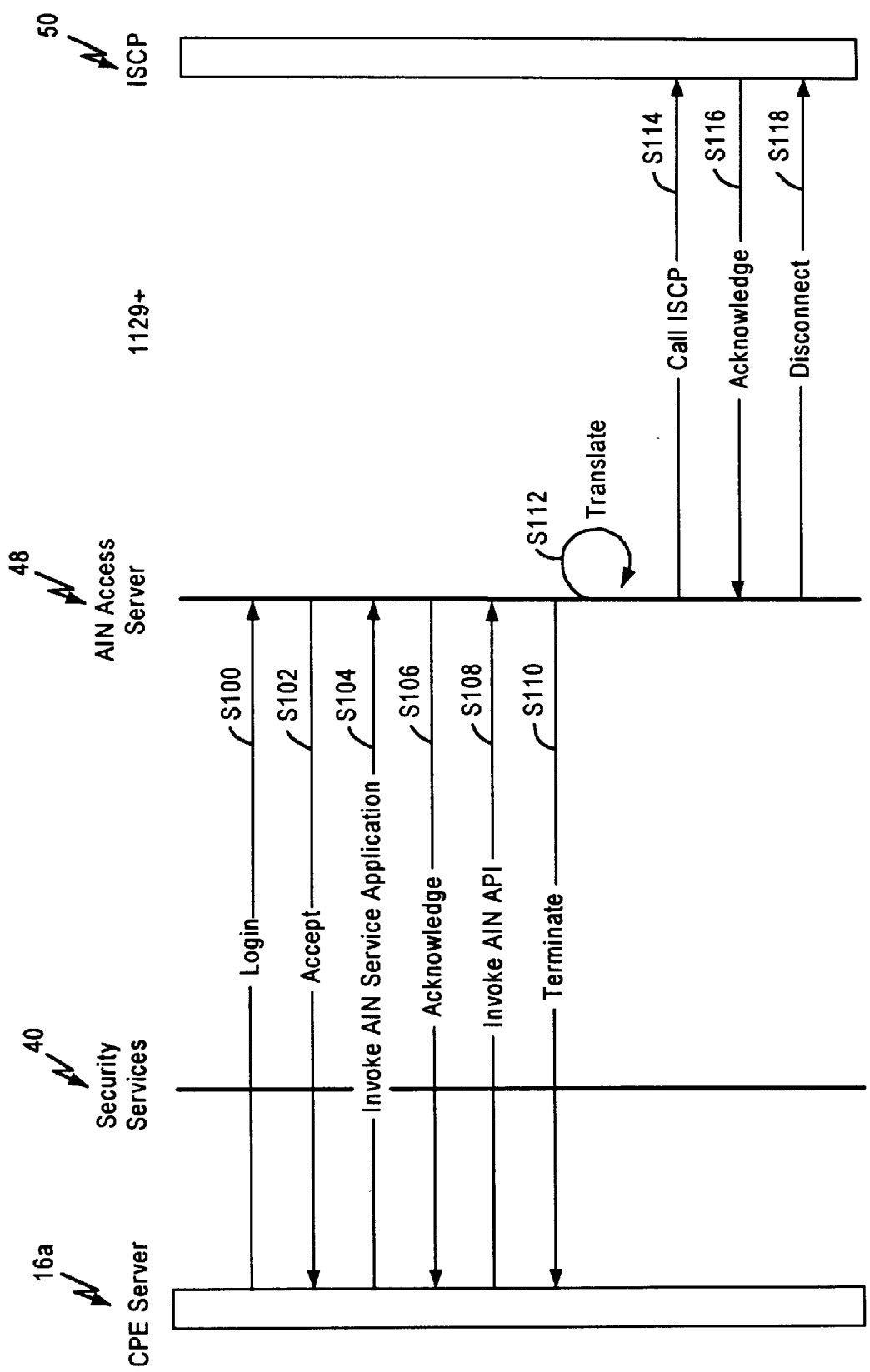
FIGS. 4A, 4B, and 4C are exemplary call flow diagrams illustrating call processing sequences of the AIN customer provisioning system of FIG. 2.

FIG. 4A is an exemplary call flow diagram illustrating the call processing sequence of the customer provisioning system of FIG. 2. As shown in FIG. 4A, the firewall server 40 routes the call by the CPE server 16*a* to the access server 48 upon the determination by the firewall server 40 that the CPE server 16*a* is authorized to connect the access server 48. The CPE server 16*a* supplies a login request message to the access server 48 in step S100. The OLTP 76 of the AIN access server 48 processes the login request, and determines with its own internal security protocol whether the CPE server 16*a* should be granted access to the AIN access server 48. If the access is granted, the AIN access server 48 supplies an accept message to the CPE server 16*a* in step S102, equivalent to a hand-shaking procedure.

Upon receiving the accept message, the CPE server 16*a* supplies a message requesting the AIN access server 48 to invoke an AIN service application in step S104. Depending on the available services provided by the advanced intelligent network, the CPE server 16*a* may be offered a variety of different AIN service applications.

After the CPE server 16a requests the AIN access server 48 to invoke a selected AIN service application in step S104, the AIN access server 48 sends an acknowledgement message to the CPE server 16a in step S106. Upon receiving the acknowledgement in step S106, the CPE server 16a sends the service request including the transaction data for any of the users of the customer premises equipment 16 in step 108. Upon receiving the service request, the AIN access server 48 acknowledges receipt of the service request and issues a terminate message to the CPE server 16a in step S110.

After the communication session between the CPE server 16a and the AIN access server 48 is terminated by the on-line transaction processor 76, the AIN router 78 and AIN API 80 perform the routing and translation functions on the received service request in step S112. The transaction data is translated and routed as an AIN message having an 1129+ interface protocol to the ISCP 50 in step S114. Messages to other AIN nodes such as another SCP or SMS may be sent either simultaneously or sequentially in accordance with the logical location of the services created. Upon receiving an acknowledgement from the ISCP 50 in step S116, the AIN access server 48 disconnects the call from the ISCP 50 in step S118. The ISCP 50 thereafter updates internal databases, and outputs any necessary messages to the programmable nodes of the advanced intelligent network to implement the service request. Alternatively, if the service request cannot be executed, the ISCP will send a message back to the AIN access server 48, or alternatively to the NAP 11 servicing the CPE server 16a.

After the service has been implemented, the ISCP 50 may send a message to the NAP 11 to dial the CPE 16a to advise the customer that the service has been installed. An example of an automated service notification system is found in commonly-assigned, allowed U.S. application Ser. No. 08/035,769, filed Mar. 23, 1993, entitled "Automated Service Assurance Method and System," now U.S. Pat. No. 5,428,679, issued Jun. 27, 1995, the disclosure of which is incorporated in its entirety by reference.

As shown above, the present invention is able to provide remote activation, changes and modification to a customer's existing profile. If desired, the advanced intelligent network may provide a variety of on-line customer provisioning features, including initial registration and service creation for a new subscriber, as well as enabling a subscriber to add new services or change existing services, or remove/deactivate existing services.

As discussed above, the access server 48 enables customer premises equipment to be used for providing service requests to the advanced intelligent network. Since the service request can be prepared off line at the customer premises by a customer 16b using a personal computer to manage the transaction data, relatively sophisticated service features may be prepared in advance at the customer premises 16 without unduly burdening the network resources. In addition, the present invention may be used to supplement, or even replace the conventional DTMF inputs typically interfaced with the intelligent peripheral. Thus, any DTMF provisioning service using an intelligent peripheral as a voice response unit can be converted into a data service unit using the AIN access server 48.

An exemplary AIN service application that takes advantage of the sophisticated customer provisioning technique of the present invention is a portable number calling (PNC) service. The PNC service is an AIN enhanced call routing application that provides subscribers with a virtual personal number. The PNC service is especially suited for businesses and/or agencies that are implemented as virtual office environments, and for mobile employees that require immediate availability, such as consultants or sales work force, or emergency response personnel. The PNC service enables the subscriber to control call routing by modifying a weekly itinerary that contains the subscriber's schedule and location for each day. Callers attempting to reach the subscriber are transparently routed to the subscriber's current location based on the time and date registered in their personal schedule.

At the subscriber premises 16, the customer uses the personal computer 16b to display, update, and maintain the schedules using, for example, a Microsoft Windows Graphical User Interface (GUI). Current schedules that are stored in the network may be downloaded to the customer's personal computer 16b.

Figure 5A:
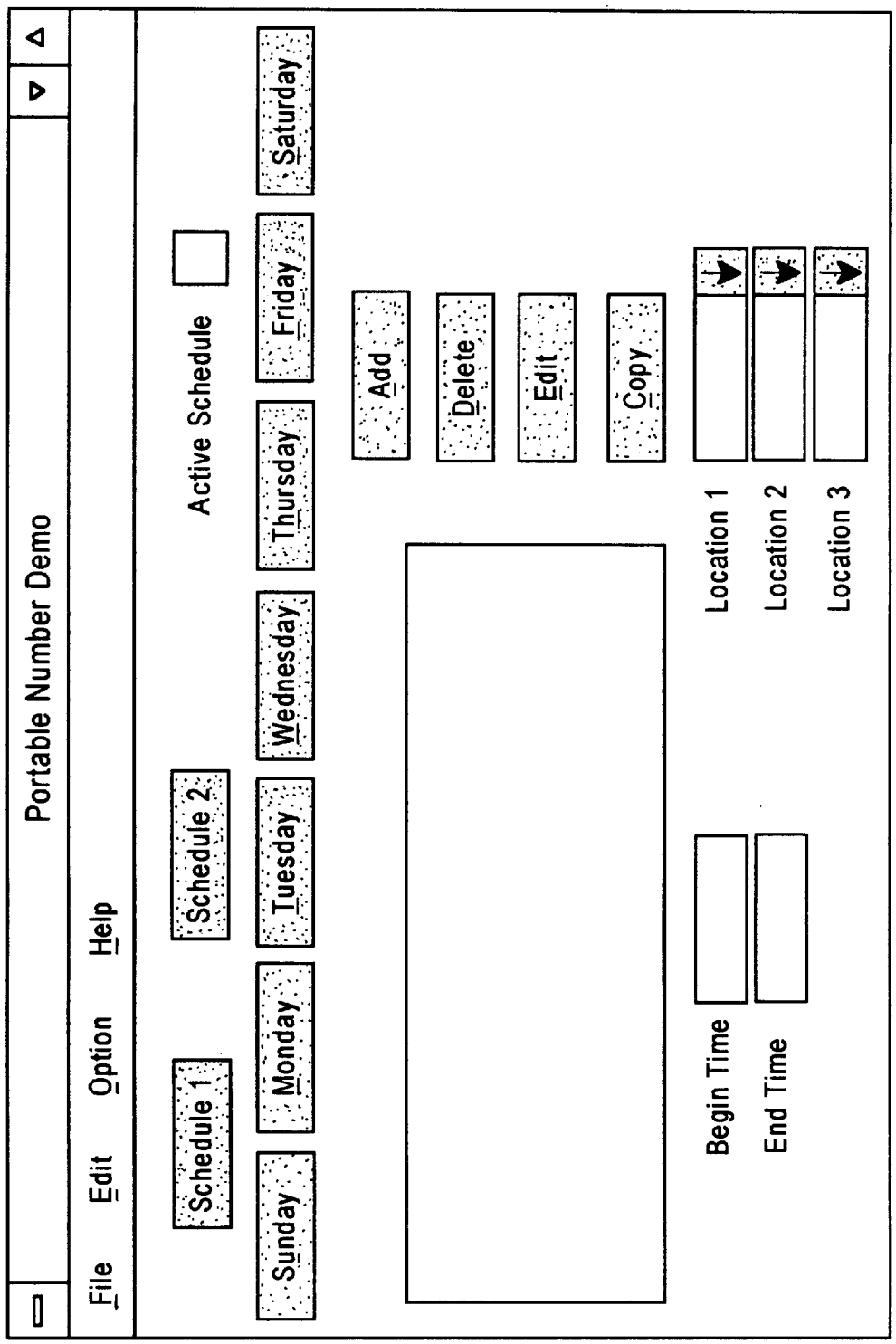

FIGS. 5A, 5B and 5C disclose exemplary displays of the graphic user interface at the customer's personal computer 16b for displaying, editing, and/or deleting transaction data corresponding to the user's profile. For example, FIG. 5B illustrates a MICROSOFT WINDOWS graphic user interface allowing a user of the computer 16b to enter the identifying information for a new user. The display in FIG. 5B provides a plurality of location numbers for a user having the assigned virtual number (123) 456-7890. As shown in FIG. 5B, the user may enter telephone numbers for home, office, second office, cellular office, and miscellaneous. The user may select one of these numbers as a default number or may have a separate number as the default number.

FIG. 5A discloses a MICROSOFT WINDOWS screen to enable the user to establish the call routing schedule. For example, a user may establish a schedule by selecting a day and inputting a begin time and end time. The user then selects a location 1, a location 2 and a location 3 for call routing purposes. For example, if the telephone number at location 1 is busy, or if there is no answer after four rings, the AIN network may switch the call to location 2, which may be an alternative location, such as a cellular telephone. Similarly, if the line is busy or there is no answer after four rings, the call may be forwarded to location 3, which may be a secretary office or a voice mail system. Similarly, the display in FIG. 5a shows a first and second schedule that may be accessed for editing and activation. Thus, the two schedules may be used either as overlay schedules, for example, for business or vacation, or may be used as two separate weeks of one-week intervals.

FIG. 5C shows a schedule override screen which may be used to make temporary modifications to a user's schedule. In such a case, the normal user's schedule stored in the SSP 10 or the call processing record (CPR) in the ISCP database is bypassed for a predetermined time in accordance with the schedule override.

Referring to FIG. 4A, the call procedure will be described in the context of the portable number call (PNC) service. The CPE service 16a performs the login procedure in step S100, and the AIN access server 48 accepts the login in step S102. In step S104, the CPE server 16a requests the AIN access server to invoke the scheduling application for the personal number calling service. The AIN access server 48 responds by displaying the stored schedule in step S106. The displayed schedule may be stored in the AIN access server 48, or alternately, the AIN access server 48 may send a data request message in 1129+ format to the ISCP database 50 in order to receive the schedule for the customer 16. In step S108, the CPE server 16a requests the AIN access server to invoke the update schedule programmed for the portable number calling service, and transmits the service request containing the transaction data for the user's schedules. Upon receiving the service request, the AIN access server 48 sends an acknowledgement and terminates the call in step S110.

The AIN access server in step S112 processes the service request by analyzing the transaction data, generating the appropriate routing for the transaction data using the AIN router 78, including all necessary ISCP systems 50, SCP systems 62 and all switches 10. After performing the translation in step S112, the AIN access server 48 calls the ISCPs in step S114 in order to send the translated transaction data to the ISCP database. The ISCP 50 sends an acknowledgement of the message in step S116, after which the AIN access server 48 disconnects the call in step S118.

Figure 4B:
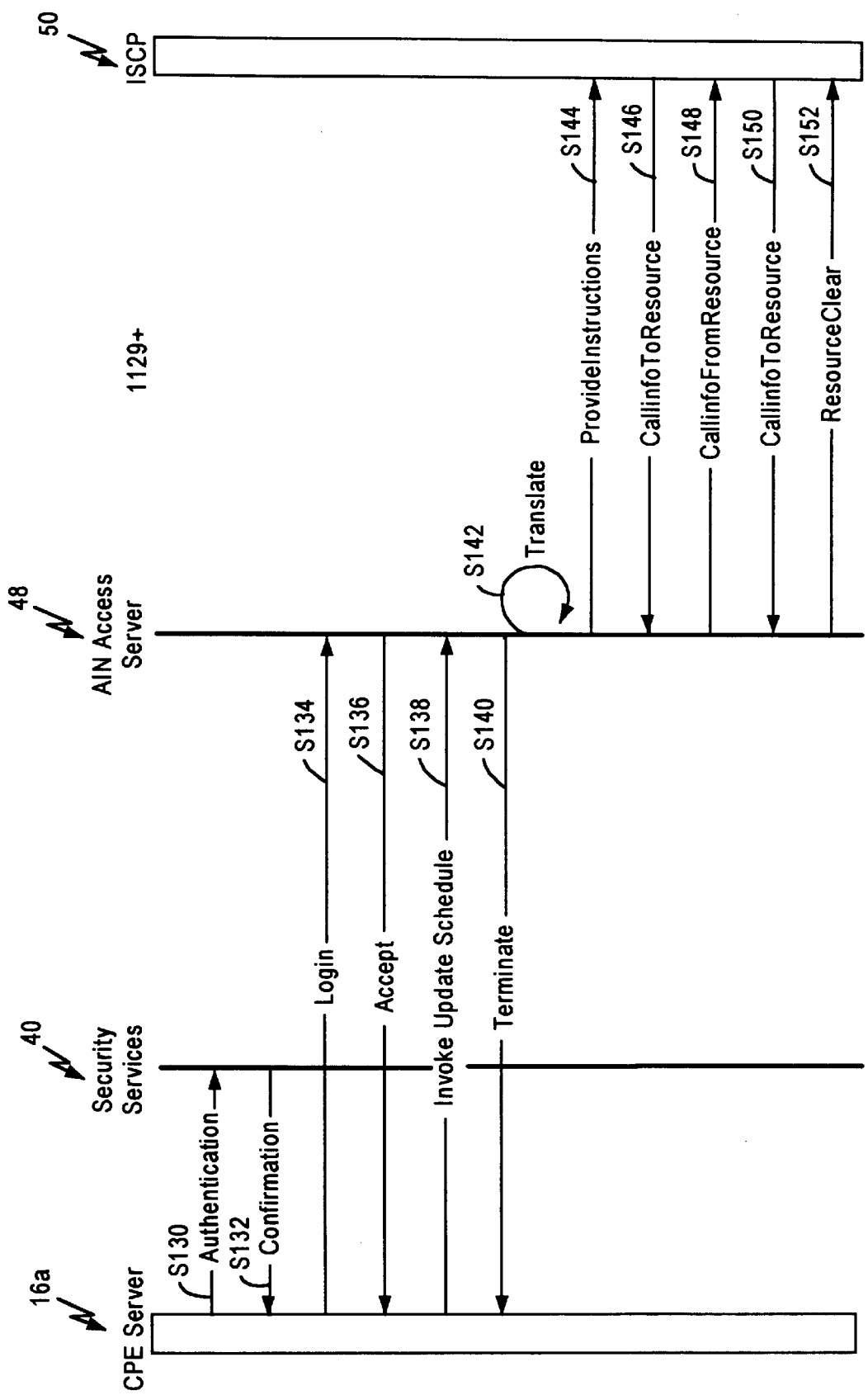

FIG. 4B discloses an exemplary call flow structure for the updating of the schedules in the PNC service applications. In FIG. 4A, the firewall server 40 provided automatic authentication, for example, by comparing the MAC address of the CPE server 16a with the stored security access information. In an advanced intelligent network system, however, a subscriber may be able to access the network by calling a virtual number from anywhere in the world. For example, the access number to reach the firewall server may be established as an 800 or a 900 telephone number. Alternatively, the firewall server 40 may be accessed via Internet or the Worldwide Web via the gateway 46. In such a case, since the firewall server 40 may not have access to the MAC address, the firewall server 40 may request an authentication, such as a user-supplied password. Thus, the remote provisioning as suggested in FIG. 4B is particularly effective for customers who essentially use a laptop computer as the CPE server 16a in order to transmit the service update information from remote locations anywhere in the world.

Referring to FIG. 4B, the CPE server 16a accesses the firewall server 40 and provides an authentication message in step S130. If the authentication message correlates to the security access information stored in the firewall server 40, the firewall server 40 sends a confirmation message to the CPE server 16a in step S132. The firewall server 40 then connects the CPE server to the access server 48 via the packet switched network 44, at which point the CPE server 16a provides the necessary login sequence in step S134 for the access server 48. After receiving the proper login sequence, the access server 48 provides the acceptance message in step S136. At this point, the CPE server 16a sends a request to update the subscriber's schedule, and includes in the service request the transaction data to be entered into the intelligent network (step S138). As discussed above, the transaction data is previously generated using the GUI displays shown in FIGS. 5A, 5B, and 5C at the customer premises. Since no further interaction is necessary between the on-line transaction processor 76 in the access server 48 and the CPE server 16a, the access server 48 outputs a terminate signal in step S140.

After terminating the session in step S140, the access server 48 performs the necessary routing and translation for the ISCP in step S142. The access server 48 then issues a message to the ISCP 50 including a request to provide instruction for updating the subscriber's call processing records (step S144). The ISCP 50 in turn accesses its internal databases and provides the necessary call processing data records to the access server 48 in step S146. The call processing data supplied to the access server 48 in step S146 may include additional call processing data needed by the access server 48 to complete the translation and routing of the server's request, for example, identifying different NAPs 10 or SCPs 62. If necessary, the access server 48 repeats the process and/or supplies the translated transaction data to the ISCP 50 in step S148, at which point the ISCP 50 returns the acknowledgement, as well as any requested call processing data in step S150. After receiving the call processing data and/or acknowledgement in step S150, the access server 48 issues a resource clear message to the ISCP 50, indicating that the call is disconnected in step S152.

Figure 4C:
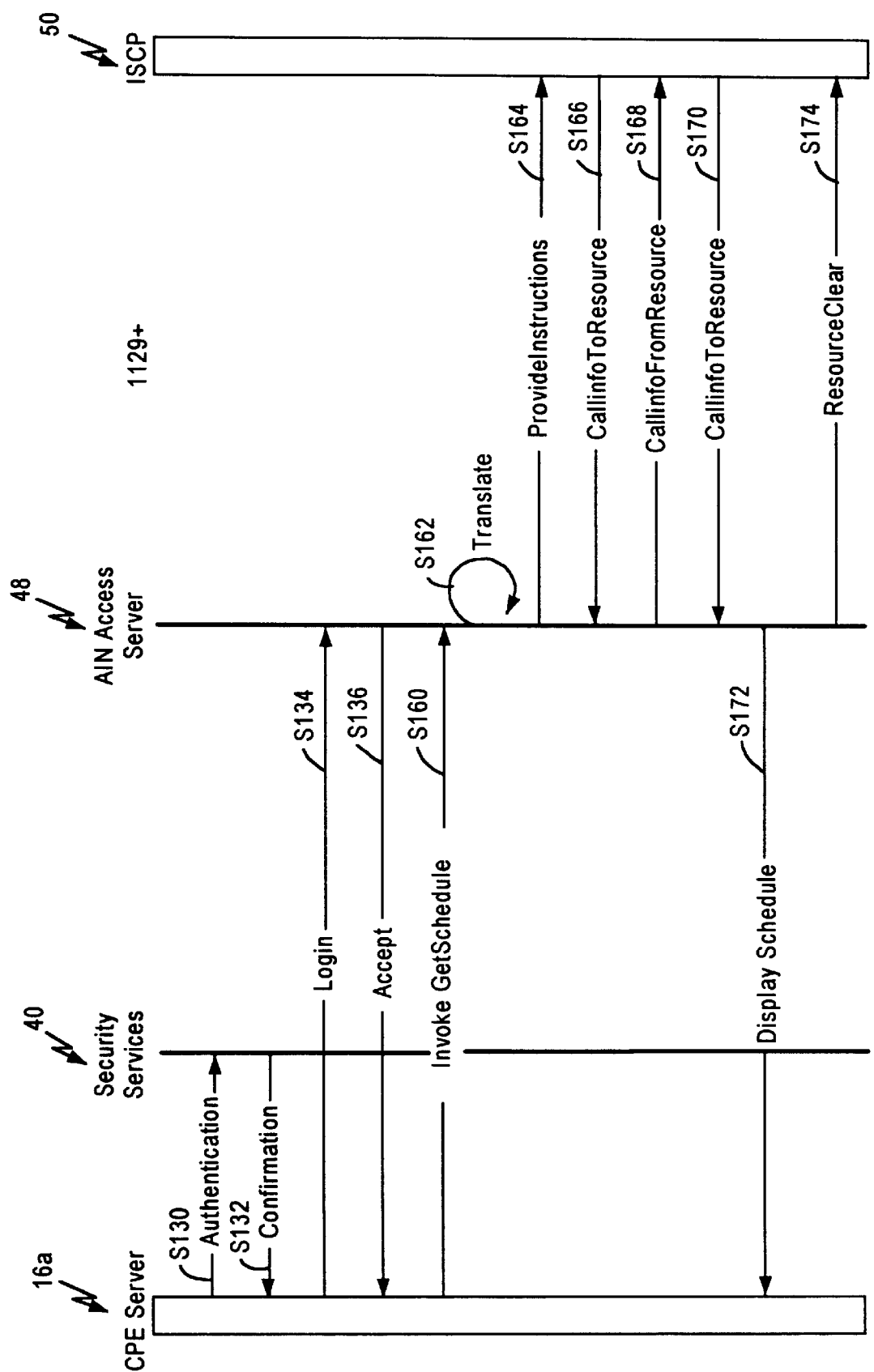

FIG. 4C shows a variation of the call processing flows of FIGS. 4A and 4B. Specifically, the access server 48 suspends the call with the CPE server 16a after receiving an application service request to access and display the stored PNC schedule in step S160. The access server 48 suspends the call with the CPE server 16a, performs the necessary translations in step S162, and sends a message in 1129+ format to the ISCP 50 in step S164. The ISCP 50 accesses the stored call processing records, and provides the call processing data to the access server 48 in step S166. The process is repeated, as needed, in step S168 and step S170. After receiving the completed call processing data, the access server 48 translates the received call processing data back into a CPE-compatible format, such as ASCII, and downloads the information to the CPE server 16a to enable the CPE server 16a to display the schedule on the computer 16b at step S172. Thereafter, the access server 48 terminates the call with the ISCP 50 in step S174, and resumes the session with the CPE server.

According to the present invention, a subscriber is able to use existing customer premises equipment to generate transaction data identifying customized AIN services, such as call forwarding, call blocking, portable number calling, etc. The transaction data may be generated in the CPE using existing software on a laptop computer. The CPE accesses the AIN via a communication link to reach a virtual number corresponding to the firewall server, also referred to as a proxy server. Thus, a subscriber may remotely provision his or her services in an efficient manner, regardless of the complexity of the service. Moreover, since the subscriber may access the system via a virtual number, the service may be provisioned at any time, at any place in the world, as opposed to Babson, III et al., which required that the terminal communicates only with a specific ISCP, thereby limiting access within a predetermined serving area of the specific ISCP. Thus, the use of the present system provides distinct advantages over existing DTMF input systems, which require manual entry. As such, such DTMF systems may be upgraded by the present invention to provide systems that are more "friendly" with users laptop computer systems.

The advantages of accessing the access server 48 from any location, for example via Internet using the gateway server 46, is particularly advantageous for creating new service from a remote location. For example, the advanced intelligent network may provide an on-line service creation function, whereby a new subscriber uses the CPE server 16a to request activation on the advanced intelligent network. In this case, for example, the CPE equipment may access the access server 48 via Internet, the GWS 46, and the firewall server 40, enabling the connection to the access server 48.

Alternatively, the customer premises equipment 16 may be connected to a telephone line that has limited service for users that are not yet subscribed onto the network, for example, emergency 911 services and on-line registration services. In such a case, when the CPE server 16a goes off hook, the SSP 10 detects a trigger due to the lack of any call processing data for the customer premises equipment 16 on the communication line 14. The SSP 10 would generate a TCAP query message to the ISCP 50. The ISCP 50 in turn would generate a routing message back to the SSP 10, directing the SSP 10 to terminate the connection to the firewall server 40. The ISCP 50 would also generate a message to the firewall server 40, directing the firewall server 40 to route the incoming communication directly to the access server 48 for on-line registration and subscription. The access server 48 would also receive a message from the ISCP 50, to initiate a first-time user subscription service application.

Once the CPE server 16a is connected to the access server 48, the customer at the computer terminal 16b follows a registration procedure identifying the customer's location, account information, type of customer premises equipment, etc. The AIN service application executed by the AIN access server 48 would identify a list of AIN services available for on-line subscription by the customer premises 16. After indicating the services that the customer would wish to subscribe to, the subscriber would supply the relevant transaction data for the individual users at the customer premises site 16. Such transaction data may include, for example, user ID, user telephone numbers, user schedules for the corresponding telephone numbers, and user access passwords.

According to the preferred embodiment, the CPE equipment executes a software which provides a presentation layer as described with respect to FIGS. 5A, 5B and 5C. As will be appreciated in the art, a lower level presentation layer may be used that includes certain identifying characters to identify transaction data, such as number fields. Alternatively, the on-line transaction processor 76 may provide a more interactive functionality with the CPE server enabling a user, at his or her option, to run the presentation layer software disclosed in FIG. 5 either on-line or off-line.

Although the disclosed embodiment is primarily directed to activating, modifying or deleting existing services, it will be appreciated that the access server may also be used to provide service creation of new service for new subscribers. Similarly, the customer provisioning system of the present invention may be modified to control the SSP and the STP from the customer premises equipment with secure communications. In such cases, STPs may be controlled over the recent change channel of the signalling network. Moreover, excess SCP utilization may be supplied for sale through particular service requests based on STP routing. As such, control of routing through STPs via ISCP may also be provided by the present invention.

In variation of the above, the AIN customer provisioning system of the present invention may be used to modify and control billing, switch translations, and CLASS features.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

What is claimed is:

1. In an advanced intelligent network (AIN) comprising a plurality of AIN elements, at least one of said plurality of AIN elements receiving and storing data in order to activate, modify, or delete AIN services for customers a plurality of network access points, and a plurality of communication links connecting the network access points and connecting terminal equipment including a computer based system for managing AIN services at a customer location to a corresponding one of the network access points, a system for changing AIN services from a service request message generated by the terminal equipment at the customer location, the system comprising:

a proxy server providing limited access to the AIN network by said terminal equipment at a customer location via one of the plurality of network access points in accordance with a predetermined security access procedure; and an access server in communication with said proxy server and said plurality of AIN elements and storing a plurality of AIN interface protocols for corresponding AIN elements, said access server receiving from said proxy server the service request message generated by the terminal equipment, said service request message identifying a change in service to be implemented in one of said AIN elements, said access server converting said service request message from a first format corresponding to said terminal equipment to one of said AIN interface protocols corresponding to said one AIN element and routing the converted service request message to the one specified AIN element.

2. A system as recited in claim 1, wherein said service request message comprises user data having one of a DOS, WINDOWS NT, APPLE MACINTOSH, OS/2, and UNIX format.

3. A system as recited in claim 2, wherein at least one of said AIN elements is an integrated services control point (ISCP) having an ISCP interface protocol, said access server converting said user data having said corresponding format to said converted service request message having said ISCP interface protocol.

4. A system as recited in claim 3, wherein at least another one of said AIN elements is a service creation platform having a provisioning protocol, said access server selectively converting said user data, in accordance with a corresponding transaction size, to one of said provisioning protocol and said ISCP protocol and routing said converted service request message to said service creation platform and ISCP, respectively.

5. A system as recited in claim 3, wherein said service request message comprises ASCII data and said converted service request message comprises data in TCAP format converted from said ASCII data by said access server.

6. A system as recited in claim 3, wherein said service request message comprises ASCII data and said converted service request message comprises data in 1129+ format converted from said ASCII data by said access server.

7. A system as recited in claim 3, wherein said service request message comprises ASCII data and said converted service request message comprises data in GDI format converted from said ASCII data by said access server.

8. A system as recited in claim 1, wherein one of said AIN elements is an integrated services control point (ISCP), said access server comprising:

an ISCP interface application for translating at least a portion of said service request to a protocol recognized by said ISCP and routing the translated at least a portion of said service request to said ISCP; and a transaction processing application for translating and routing at least a second portion of said service request to another of said AIN elements in a protocol recognized by said another of said AIN elements.

9. A system as recited in claim 1, wherein said proxy server receives said service request via one of said communication links connecting said one of the network access points to said proxy server.

10. A system as recited in claim 1, further comprising a gateway server for sending messages to and from Internet, said gateway server receiving said service request from the Internet and supplying the received service request to said proxy server.

11. A system as recited in claim 1, wherein said proxy server receives said service request via one of said communication links connecting one of said network access points, corresponding to a virtual number, to said proxy server.

12. A system as recited in claim 1, further comprising a packet switched network for transporting data between said access server and said AIN elements and for receiving said service request from said proxy server.

13. In an advanced intelligent network (AIN) comprising a plurality of AIN elements, at least one of said plurality of AIN elements receiving and storing data in order to activate, modify, or delete AIN services for customers, a plurality of network access points, and a plurality of communication links connecting the network access points and connecting terminal equipment including a computer based system for managing AIN services at a customer location to a corresponding one of the network access points, a system for changing AIN services from a service request message generated by the terminal equipment at the customer location, the system comprising:

a proxy server providing limited access to the AIN network by said terminal equipment at a customer location via one of the plurality of network access points in accordance with a predetermined security access procedure; and an access server in communication with said proxy server and said plurality of AIN elements and storing a plurality of AIN interface protocols for corresponding AIN elements, said access server receiving from said proxy server the service request message generated by the terminal equipment, said service request message identifying a change in service to be implemented in one of said AIN elements, said access server converting said service request message from a first format corresponding to said terminal equipment to one of said AIN interface protocols corresponding to said one AIN element and routing the converted service request message to the one specified AIN element, wherein said access server comprises a router portion for routing selected portions of said service request message to a selected group of said AIN elements in respective AIN protocol formats.

14. A system as recited in claim 13, wherein said access server further comprises an adaptive protocol interface for translating selected portions of said service request from said first format to said AIN protocol formats corresponding to said selected group of said AIN elements.

15. A system as recited in claim 14, wherein said access server further comprises an online transaction processor for controlling a communication session with said terminal equipment to receive said service request.

16. A system as recited in claim 13, wherein said router portion routes said service request on the basis of a transaction type, transaction side, current transaction load, transaction service, transaction response time requirement, and transaction destination.

17. A system as recited in claim 13, wherein said router portion routes said service request in accordance with application system routing, current communications load, response time requirements, and security requirements.

18. A system comprising:

an intelligent communication network for providing selected customized communications services to subscribers utilizing a plurality of customer premises equipment, said intelligent communication network comprising a plurality of programmable nodes, at least one of the plurality of programmable nodes receiving and storing data in order to activate, modify, or delete AIN services for customers, communication links and an internodal signaling network separate from the communications links;

a packet switched network coupled to the programmable nodes for carrying programming data;

a proxy server providing limited access to the packet network from a customer terminal via a link through the intelligent communication network in accordance with a predetermined security access procedure;

an access server coupled to the packet switched network and storing a plurality of interface protocols for corresponding programmable nodes of the intelligent communication network, said access server receiving via said proxy server and said packet data network service information from the customer terminal related to a service to be implemented for one of the subscribers on at least one of the communication links by at least one of the programmable nodes of the intelligent communication network, said access server converting the service information from a format corresponding to the customer terminal to at least one of the interface protocols corresponding to said at least one of the programmable nodes and routing the converted service information to the corresponding at least one of the programmable nodes via the packet switched network.

19. A system as recited in claim 18, wherein said interface protocols stored in said access server include TCAP, 1129+, and GDI.

20. A system as recited in claim 18, further comprising a gateway server for sending messages to and from Internet, said gateway server receiving said service information from the Internet and supplying the received service request to said proxy server.

21. A system as recited in claim 18, wherein said service information comprises user profile data and user scheduling data for a portable number calling service, said access server routing the converted service information to implement said portable number calling service in said intelligent communication network.

22. In an intelligent communication network having a plurality of programmable nodes, communication links between at least a portion of said programmable nodes, and a packet switched network comprising a proxy server and an access server for transporting service configuration data between the programmable nodes, a method for changing customized communications services for users of the intelligent communication network from customer premises equipment using computer software for managing AIN services connected to a network access point, the method comprising the steps of:

providing protocol translation information to the access server enabling protocol translation from a first protocol output by said customer premises equipment to one of a plurality of interface protocols corresponding to said programmable nodes, respectively;

supplying security access information to the proxy server enabling limited access by said customer premises equipment through the proxy server to the access server via said packet switched network;

transporting a service request message received by the network access point from said customer premises equipment to the proxy server via one of said communication links;

passing said service request message from the proxy server to the access server in accordance with said security access information;

translating said service request message from said first protocol to at least one of said interface protocols for a corresponding programmable node selected in accordance with said service request message; and routing said translated service request message to said selected at least one programmable node.

23. A method as recited in claim 22, wherein said interface protocols comprise TCAP, 1129+, and GDI.

24. A method as recited in claim 22, wherein said passing step comprises the step of initiating an interface session between said customer premises equipment and the access server using an online transaction processor disposed in the access server.

25. In an intelligent communication network having a plurality of switches, an integrated services control point (ISCP), signaling links between at least a portion of said switches and said ISCP, and a packet switched network comprising a proxy server and an access server for transporting service configuration data between the ISCP and said switches, a method for activating customized communications services for new users of the intelligent communication network from customer premises equipment connected to a first switch, the method comprising the steps of:

providing protocol translation information to said access server enabling protocol translation from a first protocol output by said customer premises equipment to one of a plurality of interface protocols readable at least by said ISCP;

supplying security access information to said proxy server enabling limited access by said customer premises equipment from said proxy server to said access server via said packet switched network;

generating a query message from said first switch to said ISCP via one of said signaling links in response to a call request from said customer premises equipment on a communication link providing limited services;

outputting a terminate message from said ISCP in response to said query message;

terminating said call from said first switch to said proxy server in accordance with said terminate message;

passing a service request message generated by said customer premises equipment to said access server in accordance with said security access information, said service request message comprising new subscriber transaction data;

translating said service request message from said first protocol to at least one of said interface protocols readable by said ISCP in accordance with said service request message; and routing said translated service request message to activate said customized communications services.

26. A method as recited in claim 25, wherein said interface protocols comprise TCAP, 1129+, and GDI.

27. A method as recited in claim 25, wherein said passing step comprises the step of initiating an interface session between said customer premises equipment and said access server using an online transaction processor disposed in said access server.

* * * * *